United States Patent [19]

Ohma

[11] Patent Number: 5,346,236
[45] Date of Patent: Sep. 13, 1994

[54] SUSPENSION DEVICE FOR BICYCLE

[75] Inventor: Toshio Ohma, Shizuoka, Japan

[73] Assignee: Showa Corporation, Shizuoka, Japan

[21] Appl. No.: 95,717

[22] Filed: Jul. 21, 1993

[30] Foreign Application Priority Data

Jul. 29, 1992 [JP] Japan .............................. 4-058444[U]

[51] Int. Cl.$^5$ ............................................. B62K 25/08
[52] U.S. Cl. .................................. 280/276; 188/299;
267/218
[58] Field of Search ............... 280/276, 277, 284, 285,
280/286, 283, 275; 188/297, 299, 316, 317, 313,
322.19; 267/218, 220, 221, 226

[56] References Cited

U.S. PATENT DOCUMENTS

| | | | |
|---|---|---|---|
| 4,776,440 | 10/1988 | Yamada et al. | 188/297 |
| 4,971,344 | 11/1990 | Turner | 180/276 |
| 5,044,648 | 9/1991 | Knapp | 280/276 |
| 5,088,705 | 2/1992 | Tsai | 267/226 |

FOREIGN PATENT DOCUMENTS

| | | | |
|---|---|---|---|
| 420610 | 4/1991 | European Pat. Off. | 280/276 |
| 2231289 | 9/1990 | Japan . | |
| 143774 | 5/1950 | Sweden | 280/276 |

Primary Examiner—Margaret A. Focarino
Assistant Examiner—Kevin Hurley
Attorney, Agent, or Firm—Dvorak and Traub

[57] ABSTRACT

In a suspension device 20 for a bicycle, a partitioning member 91 is disposed in a fluid chamber in a fork leg 23 beneath a damping force generating device 24 in the slidable fashion for axial sliding movement of said fork leg 23.

6 Claims, 4 Drawing Sheets

SUSPENSION DEVICE FOR BICYCLE

BACKGROUND OF THE INVENTION

1. Field of the Invention

The present invention relates to a suspension device for a bicycle.

2. Description of the Background Art

Conventionally, in an off-road bicycle, there has been employed "a suspension device which comprises a pair of left and right slide tubes fixed to a steering bracket rotatably supported at the front end portion of a frame of the bicycle, and a pair of left and right cylindrical fork legs slidably engaged with the slide tubes and holding a front wheel, fluid chambers and gas chambers being defined within internal spaces respectively extending between the slide tubes and the fork legs, and damping force generating devices disposed within the fluid chambers between the slide tubes and the fork legs", as disclosed in Japanese Unexamined Patent Publication No. 2-231289.

With such a suspension device, upon relative movement between the sliding tubes and fork legs by expansion and compression due to undulation of the road surface, road shock can be absorbed by the action of a pneumatic spring generated as a reaction force of gas pressure in the gas chambers and by damping function provided by the damping force generating device for the working fluid in the fluid chamber.

In the above-mentioned prior art, a gas valve acting as an enclosed gas pressure adjusting means is provided in a top end cap of the slide tube so as to attain a pneumatic spring force of the gas spring necessary for certainly provide desired level of riding comfort depending upon the taste and weight of the rider.

However, in the prior art, there have been encountered problems ① and ② set out below.

① When adjusting the enclosed gas pressure, a gas supply device has to be connected to the gas valve for increasing the pressure and gas discharging operation must be used a gas discharging tool. The need to use a gas supply device and a gas discharging tool to make adjustment of the enclosed gas pressure during use of the bicycle is made very difficult.

② The need to provide a gas valve as the enclosed gas pressure adjusting means in the cap of slide tube creates a rise in cost. Furthermore, if an operation member of an adjuster extending in the axial direction of the slide tube is used as a damping force adjusting means of the above-mentioned damping force generating device, it would be provided in the cap of the slide tube, and the operation member for the adjuster would need to be provided in the cap, to which the air valve has to be provided, all of which would make the configuration of the cap extremely complicated.

SUMMARY OF THE INVENTION

It is an object of the present invention to enable free adjustment of an enclosed gas pressure with a simplified construction.

A suspension device for a bicycle, according to the present invention, comprises a pair of left and right slide tubes fixed to a steering bracket which is, in turn, rotatably supported at the front portion of the bicycle;

a pair of left and right fork legs coupled with the slide tube in slidable fashion and holding a front wheel;

fluid chambers and gas chambers extending over both of the slide tube and the fork leg;

damping force generating device provided within the fluid chamber between the slide tube and the fork leg;

the suspension device further comprising:

a partitioning wall member disposed within the fluid chamber in the fork leg at the lower side of the damping force generating device and slidable within an axial direction of the fork leg.

In one aspect of the invention, the partitioning wall member may comprise an O ring externally fitted thereto, an adjusting screw integrated by contacting at the back side, a female screw portion provided in the fork leg for engagement with the adjusting screw, an operating portion of the adjusting screw extending out of the fork leg, the operating portion of the adjusting screw being sliding in the axial direction of the fork leg, and the adjusting screw being locked by a lock nut engaging with the adjusting screw.

Also, the operating portion of the adjusting screw may be extended into an external recess of the fork leg, the external recess being sealed with a cover for protecting the adjusting screw from dust and dirt.

Furthermore, an operation member of an adjuster extending in the axial direction of the slide tube may be provided in a cap of the slide tube as a damping force adjusting means of the damping force generating device.

According to the present invention, the following function and advantages can be obtained.

When the enclosed gas pressure is to be increased, the partitioning wall member is caused to slide in a direction for reducing the volume of the gas chamber. On the other hand, when the enclosed gas pressure is to be reduced, the partitioning wall member is caused to slide in the direction for expanding the volume of the gas chamber.

Since accessories such as a gas supply device, discharge device, and so forth, are unnecessary, the enclosed gas pressure can be adjusted freely during use of the bicycle. The resilience necessary to obtain the desired level of riding comfort can be easily adjusted depending upon the taste and difference of the weight of the user.

The gas valve as the enclosed gas pressure adjusting means is provided integrally with the closure member. Although the gas valve can be used as the initial enclosed gas filling means at the production stage, this would not be indispensable. Accordingly, by not providing the gas valve in the closure member, the cost can be decreased. Also, when the operation member of the adjuster serving as the damping force generating means is provided on the closure member, the construction involving the closure member can be simplified.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIGS. 1(A), 1(B) and 1(C) show one embodiment of a suspension assembly as a suspension device according to the present invention, in which FIG. 1(A) is a partial section showing the overall construction, FIG. 1(B) is an illustration as seen along the arrow B, FIG. 1(C) is a section taken along line C—C;

FIGS. 4(A) and 4(B) show a piston body, in which FIG. 4(A) is a section and FIG. 4(B) is a plan view;

DESCRIPTION OF THE PREFERRED EMBODIMENT

Figure 6:
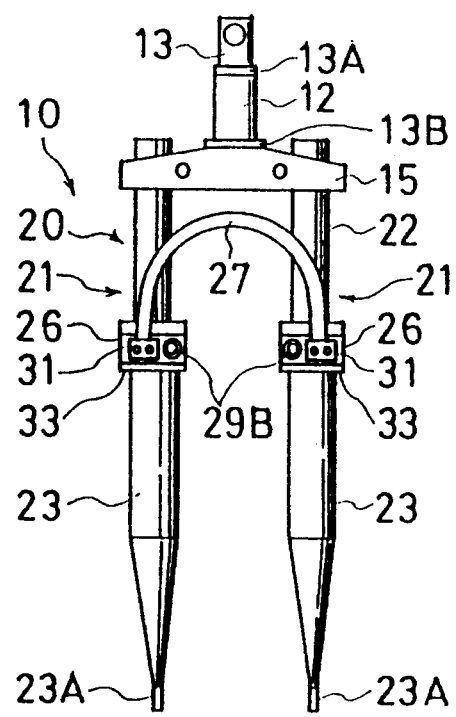
FIG. 6 is a front elevation of the major part of a suspension device.
Figure 7:
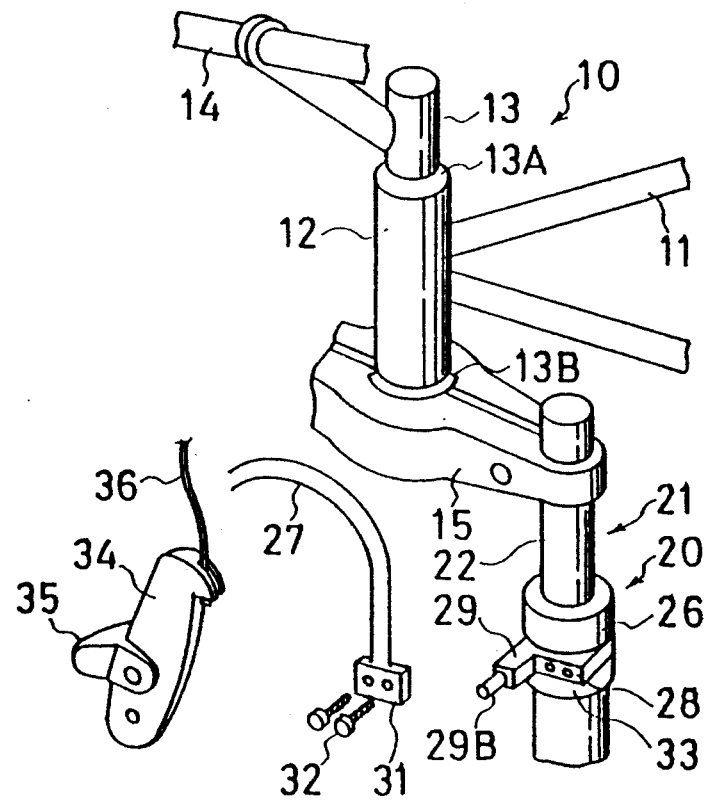
FIG. 7 is a perspective view showing the major part of the suspension device.

As shown in FIGS. 6 and 7, a bicycle 10 includes a steering shaft 13 rotatably supported by bearings 13A and 13B which are provided at upper and lower ends of a head pipe 12 positioned at a front portion of a frame 11. A handle bar 14 is fixed to the upper end of the steering shaft 13 extending upwardly. On the other hand, a steering bracket 15 is fixed to the lower end of the steering shaft 13 extending downwardly.

A suspension device 20 according to the present invention, includes a pair of left and right suspension assemblies 21 for expansion and compression. Each suspension assembly 21 comprises a slide tube 22 fixed to a steering bracket 15, a cylindrical fork leg 23 slidably engaged with the slide tube 22 for holding a front wheel, a fluid chamber and a gas chamber defined in an internal space extending through both of the slide tube 22 and the fork leg 23, and a damping force generating device 24 provided in the fluid chamber between the slide tube 22 and the fork leg 23.

It should be appreciated that the fork leg 23 is formed by a cold forging of a tubular material and is provided with a flattened wheel supporting portion 23A at the lower end.

As shown in FIGS. 1, 2, 6 and 7, the suspension device 20 has a cross member holder 26 externally fitted on the outer periphery of the lower portion of an upper larger diameter portion 25 of the left and right fork legs 23. Left and right cross member holders 26 are coupled by means of an essentially U shaped cross member 27 which has a predetermined torsional rigidity. Each cross member holder 26 is secured on the outer periphery of each fork leg 23 by a bond, and held between the upper larger diameter portion 25 of the fork leg 23 and a lock nut 33 threadingly engaged to the outer periphery of the fork leg 23. By this means, the suspension device 20 compensates for stiffness by the interaction of the slide tube 22 and the fork leg 23. In addition, the suspension device 20 provides positive rigidity of the fork leg 23 against a torsional force acting on the fork leg 23 due to a braking reacting force exerted on a brake lever 34 described later, upon actuation of a brake.

Figure 3:
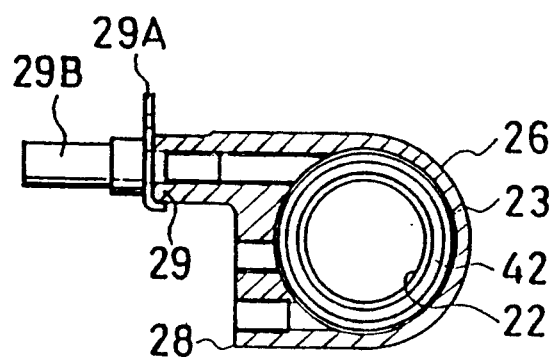
FIG. 3 is a plan view of a cross member holder.

The cross member holder 26 is an annular body as shown in FIG. 3 and has a cross member mounting boss 28 and a brake lever mounting boss 29. The cross member 27 is mounted on the cross member mounting boss 28 of the cross member holder 26 by means of a mounting screw 32 at a mounting portion 31 in the base end.

The brake lever mounting boss 29 of the cross member holder 26, as shown in FIG. 7, and the brake lever 34 forming a rim type brake system are mounted and held together by means of a plate 29A and an anchor pin 29B. The reference numeral 35 denotes a brake pad, and 36 denotes a brake wire.

It should be noted that the cross member holder 26 may use the cross member mounting boss 28 as the brake lever mounting boss so that the brake lever 34 is fixed and held together with the cross member 27.

On the other hand, the cross member holder 26 may be provided with a recess on the inner periphery to engage with a projection provided on the outer periphery of the fork leg 23 radially outside of the fork leg 23 for preventing relative angular displacement with respect to the fork leg 23. Cross member holder 26 is sandwiched and held between the upper larger diameter portion 25 of the fork leg 23 and the lock nut 33.

Figure 1A:
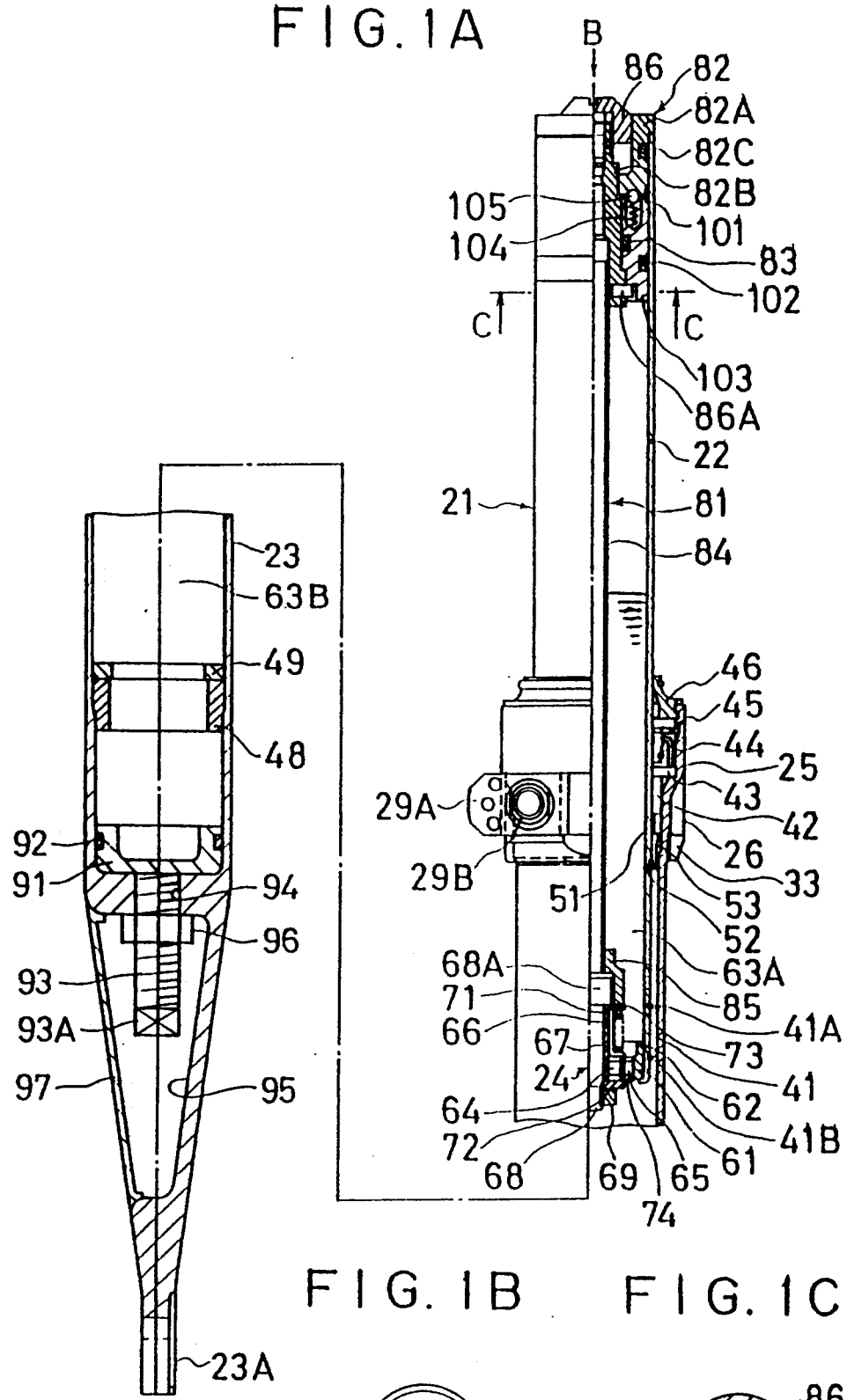
Figure 1B:
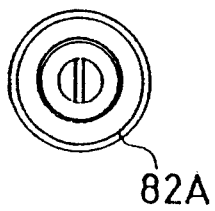
Figure 1C:
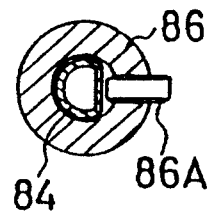
Figure 2:
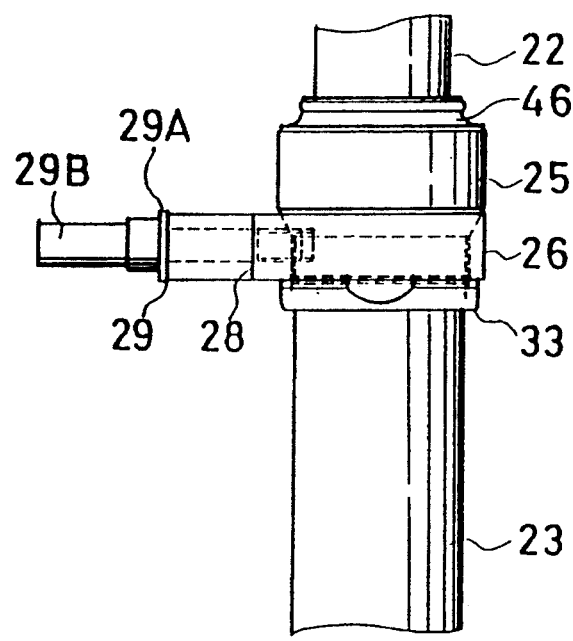
FIG. 2 is an illustration showing a suspension assembly.

As shown in FIGS. 1 and 2, the suspension assembly 21 permits relative sliding displacement between the slide tube 22 and the fork leg 23 by sliding contact between a guide bush 41 mounted at the outer periphery of the lower end of the slide tube 22 and the fork leg 23 limited by stop rings 41A and 41B. There is also sliding contact between a guide bush 42 press fitted to the inner periphery at the upper portion of the fork leg 23 and the outer periphery of the slide tube 22. It should be noted that, on the inner peripheral portion of the upper larger diameter portion 25 of the fork leg 23, a seal spacer 43, an oil seal 44, a stop ring 45 and a dust seal 46 are provided to establish seals with the slide tube 22.

On the other hand, on the inner periphery of the intermediate portion of the fork leg 23, a ring member 48 is press fitted. A rubber bumper 49 is arranged on the upper end face of the ring member 48. By this, the suspension assembly 21 can stop at the stroke end in the compression stroke by abutting the lower surface of a piston body 61 which is fixed to the inner periphery of the lower end of the slide tube 22 and as discussed later, onto the ring member 48 via the rubber bumper 49.

Also, on the inner periphery at the upper end of the fork leg 23 and beneath the guide bush 42, a rebounding rubber 51 is disposed. By this, the suspension assembly 21 can stop at the stroke end in the expansion stroke by abutting the upper end of a rebounding seat 53 which is engaged on the outer periphery of the intermediate portion of the slide tube 22 by means of the stop ring 52.

Figure 4A:
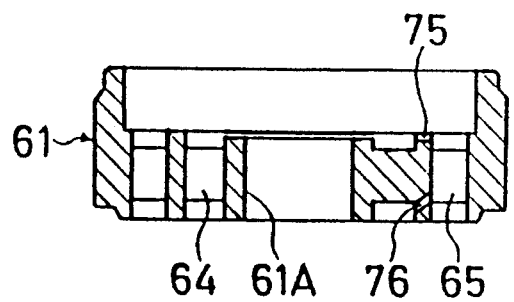
Figure 4B:
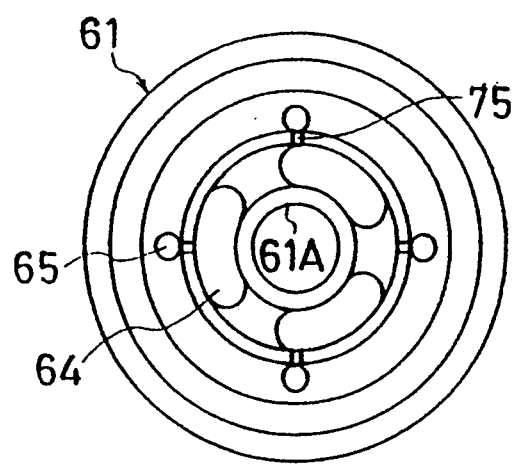

As shown in FIGS. 1 and 2, the damping force generating device 24 has the piston body 61 fixed on the inner periphery at the lower end of the slide tube 22. It should be noted that a stop ring 62 is fitted on the upper portion of the coupling portion of the slide tube 22 and the piston body 61. As shown in FIGS. 4(a) and 4(B), the piston body 61 defines an upper chamber 63A at the side of the slide tube 22 and a lower chamber 63B at the side of the fork leg 23. The piston body 61 has elongated compression stroke flow paths 64 for communication between the upper and lower chambers 63A and 63B and circular expansion stroke flow paths 65. The compression stroke side flow paths 64 are arranged at the side near the center of the piston body 61 and the expansion stroke side flow paths 65 are arranged at the side at the outer periphery side of the piston body 61.

It should be noted that the upper chamber 63A is defined by a closure member 103 as a cap, which is fixed to the upper end of the slide tube 22 by means of a stop ring 101 and has an O ring 102 externally fitted thereto, and a piston body 61 so as to enclose a working fluid at the side of the piston body 61 and air at the side of the closure member 103. On the other hand, the lower chamber 63B is defined by the partitioning member 91 which will be discussed later, and the piston body 61 for enclosing the working fluid.

On the other hand, in the damping force generating means 24, a slide valve type first valve 67 biased by a valve spring 66 in such a direction that the compression stroke side flow paths 64 are shut, is arranged on the upper chamber side of the piston body 61. When the suspension device 20 is compressed through compression stroke motion, pressure difference is caused between the upper and lower chambers 63A and 63B. When the pressure difference becomes greater than the bias force of the valve spring 66, the first valve 67 is shifted against the spring force to form a variable flow restrictive path to permit the working fluid to flow from the lower chamber 63B to the upper chamber 63A. Magnitude of fluid flow path area of the variable flow restrictive path defined by shifting of the first valve 67 is variable depending upon the magnitude of the pressure differnece. Variable magnitude of damping force is generated depending upon magnitude of flow restriction at the variable flow restrictive path.

At this time, a bolt 68 is engaged to a central hole portion 61A of the piston body 61. Between the head 68A of the bolt 68 and a nut 69, a collar 71, the piston body 61 and a valve holding member 72 are sandwiched into assembly. Around the collar 71, a spring seat 73 is provided at the side of the head 68A of the bolt 68, and the first valve 67 is mounted at the side of the piston body 61. Between the spring seat 73 and the first valve 67, a valve spring 66 is disposed. The spring seat 73 supports the head 68A of the bolt 68 and the seat position is adjustable by means of a later-mentioned adjuster 81.

On the other hand, in the damping force generating device 24, a disc valve type second valve 74 which opens the extension stroke flow passages 65 due to the negative pressure of the lower chamber 63B when the slide tube 22 and fork leg 23 are in the extension stroke, is arranged on the lower chamber 63B side of the piston body 61. When the suspension device 20 is extended with compressing the working fluid in the upper chamber 63A to cause pressure differnce between the upper and lower chambers 63A and 63B, and the pressure differnce becomes great enough to overcome the resilient force of the second valve 74, the second valve 74 is resiliently deformed to define a variable flow restrictive path between the piston body 61 to permit the working fluid to flow from the upper chamber 63A to the lower chamber 63B through the extension stroke flow path 65. Damping force against relative extension motion of the slide tube 22 and the fork leg 23 is thus generated due to flow restriction by the variable flow restrictive fluid path. Similarly to the foregoing first valve 67, the path area of the variable flow restrictive path is variable depending upon magnitude of pressure difference. It should be noted that the pneumatic chamber in the upper chamber 63A is also effective for absorbing extension energy by permitting compression of the air therein.

Figure 5:
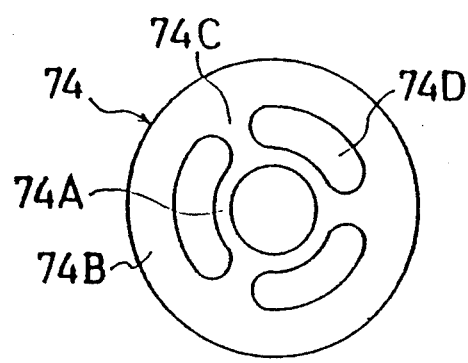
FIG. 5 is a plan view showing a disc valve.

As shown in FIG. 5, the second valve 74 comprises an inner annular portion 74A and an outer annular portion 74B. The inner and outer annular portions 74A and 74B are connected by connecting portions 74C. The inner annular portion 74A is fixed to the lower end surface of the piston body 61 by means of the nut 69 via the valve holding member 72. The outer annular portion 74B is arranged for closing the expansion stroke flow paths 65. The outer annular portion 74B can be deflected by the spring action of the connecting portion 74C so that the expansion stroke flow paths 65 can be opened and closed. It should be noted that, between the inner and outer annular portions 74a and 74B, elongated opening portions 74D corresponding to the compression stroke flow paths 64 are provided at both ends of the connecting portion 74C.

With the construction set forth above, the second valve 74 can be provided sufficient rigidity for producing sufficiently large damping force against large magnitude of pressure difference during extention stroke motion. On the other hand, the second valve 74 can have sufficiently high response characteristics even for small magnitude of pressure difference by the flexibility provided at the connecting portion 74C.

On the other hand, the damping force generating device 24 is provided with slits 75 and/or orifices 76 on the piston body 61 as fixed flow restrictive paths for constantly establishing fluid communication between the upper and lower chambers 63A and 63B. As shown in FIG. 4(A), (B), in the piston body 61, the slits 75 and the orifices 76 communicate the regions at the side of the expansion stroke flow paths 65 which is constantly held open by the first valve 67 and the region at the side of the compression stroke flow paths 64 which is constantly held open by the second valve 74. By this, the damping force generating device 24 may generate the damping force by flow resistance generated by the slits 75 and the orifices 76 establishing constant communication between the upper and lower chambers 63A and 63B in both of compression and expansion strokes of the suspension device 20.

Furthermore, through the closure member 103 provided at the top end of the slide tube 22, the operation member 82 of the adjuster 81 is mounted via an O ring 83 for rotation thereabout. The operation member 82 is an assembly of an operation cylinder 82A and a gas valve 86. At a condition where the lower end face of the operation cylinder 82A is mated with the upper end face of the closure member 103, the operation cylinder 82A and the gas valve 86 are coupled and held by means of a fixture 82B. It should be noted that the operation cylinder 82A is equipped on the slide tube 22 with fitting the O ring 82C on the outer periphery thereof. On the outer periphery of the upper end of the operation cylinder 82A forming the operation member 82 and positioned out of the slide tube 22 is provided with notching by knurling process for rotating operation. On essentially arc-shaped cross-section portion provided at the lower end of the gas valve 86 positioned within the slide tube 22, the upper end of an adjusting pipe 84 is integrated in the rotating direction while permitting relative axial displacement therebetween. On the lower end of the adjusting pipe 84, an adjusting nut 85 is fixed. The adjusting nut 85 engages with a threaded portion provided on the head portion 68A of the bolt 68. The lower end face of the nut 85 may extend from the lower end face of the head 68A to contact with the spring seat 73. The adjuster 81 permits adjustment of the damping force at the compression stroke of the suspension device 20 by adjusting the supporting position of the valve spring 66 by the spring seat 73 by depressing down the spring seat 73 by the lower end face of the nut 85 when threadingly shifting the adjusting nut 85 by the operation member 82 via the adjusting pipe 84.

It should be noted that there is at the contact portion between the lower end of the operation cylinder 82A forming the operation member 82 and the upper end of the closure member 103, a stopper device for stopping the angular position of the operation member 83 in the rotational operation in stepwise fashion. This stopper device provides a back-up for a ball 105 by a spring 104 provided within a hole opposing the upper end face of the closure member 103 so that the ball 105 engages recesses which are provided at a plurality of circumferential positions (four positions in the shown embodiment) of the lower end face of the operation cylinder 82A, in order.

In the fluid chamber (lower chamber 63B) in the lower fork leg 23 of the damping force generating device 24, a partitioning wall member 91 is inserted in axially slidable fashion. An O ring 92 is fitted on the outer periphery of the partitioning wall member 91. An adjusting screw 93 coupled and integrated with the back surface of the partitioning wall member 91 is engaged with a female thread portion 94 provided in the fork leg 23. An operating portion 93A of the adjusting screw 93 is projected into a resess 95 on the outer periphery of the fork leg 23. The partitioning wall member 91 slides in the axial direction of the fork leg 23 by turning the operating portion 93A of the adjusting screw 93 so that it may be locked by the lock nut 96 threadingly engaged to the adjusting screw 93. The partitioning wall member 91 can expand and contract the volume of the gas chamber in the upper chamber 63 by adjusting the fluid level in the fluid chamber in the upper chamber 63A. It should be noted that a recess 95 on the outer periphery of the fork leg 23 can be sealed by a cover 97 so as to protect the adjusting screw 93 from dust and dirt.

Accordingly, in the suspension device 20, in the production stage, a predetermined gas pressure can be provided in the upper chamber 63A by connecting a gas supply device to the gas valve 86. Upon adjusting the enclosed gas pressure, the slide position of the partitioning wall member 91 is adjusted for expanding and contracting the volume of the gas chamber to certainly provide arbitrary enclosed gas pressure.

Operation of the shown embodiment will be discussed herebelow.

When the enclosed gas pressure is to be increased, the partitioning wall member 91 is caused to slide in to direction for reducing the volume of the gas chamber to obtain the arbitrary enclosed gas pressure. On the other hand, when the enclosed gas pressure is to be reduced, the partitioning wall member is caused to slide in the direction for expanding the volume of the gas chamber to obtain the arbitrary enclosed gas pressure.

Namely, since accessories such as a gas supply device, discharge device and so forth, are unnecessary, the enclosed gas pressure can be adjusted freely with the simple construction during use of the bicycle. The spring force of the pneumatic spring necessary to positively obtain the desired level of riding comfort can be easily adjusted depending upon the taste and difference of the weight of the rider.

The gas valve 86 as the enclosed gas pressure adjusting means is provided with the closure member 103. Although the gas valve 86 can be used as the initial enclosed gas filling means at the production stage, this would not be indispensable. Accordingly, by not providing the gas valve 86 in the closure member 103, the cost can be decreased. Also, when the operation member 82 of the adjuster 81 is provided on the closure member 103, the construction around the closure member 103 can be simplified.

As set forth above, according to the present invention, the enclosed gas pressure can be adjusted freely with the simple construction.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A suspension device for a bicycle comprising:
   a pair of left and right side tubes fixed to a steering bracket which is, in turn, rotatably supported at the front portion of the bicycle;
   a pair of left and right fork legs coupled with said slide tubes in slidable fashion and adapted to hold a front wheel;
   fluid chambers and gas chambers extending over both of said slide tubes and said fork legs;
   damping force generating device provided within the fluid chambers between said slide tubes and said fork legs;
   the suspension device further comprising:
   a partitioning wall member disposed within each fluid chamber in each fork leg at the lower side of each damping force generating device and slidable within an axial direction of each fork leg, said partitioning wall member having partitioning wall member position adjusting means capable of manual position change from the outside.

2. A suspension device for a bicycle as set forth in claim 1, wherein said partitioning wall member comprises:
   an O ring externally fitted thereto;
   an adjusting screw which contacts a back side of said wall member;
   a female screw portion provided in each fork leg for engagement with said adjusting screw;
   an operating portion of said adjusting screw extending outwardly of each fork leg;
   said operating portion of said adjusting screw being slidable in the axial direction of each fork leg, and said adjusting screw being adapted to be locked by a lock nut engaging with said adjusting screw.

3. A suspension device for a bicycle as set forth in claim 2, wherein said operating portion of said adjusting screw is extended into an external recess of each fork leg, said external recess being sealed with a cover for protecting the adjusting screw from dust and dirt.

4. A suspension device for a bicycle as set forth in claim 1, wherein an operation member of an adjuster extending in the axial direction of each slide tube is provided in a cap of each slide tube as a damping force adjusting means of said damping force generating device.

5. A suspension device for a bicycle as set forth in claim 2, wherein an operation member of an adjuster extending in the axial direction of said slide tubes is provided in a cap of said slide tubes as a damping force adjusting means of said damping force generating device.

6. A suspension device for a bicycle as set forth in claim 3, comprising an operation member of an adjuster extending in the axial direction of said slide tubes being provided in a cap of said slide tubes as a damping force adjusting means of said damping force generating device.

* * * * *